United States Patent [19]

Sarbach et al.

[11] Patent Number: 5,164,649
[45] Date of Patent: Nov. 17, 1992

[54] METHOD AND APPARATUS FOR CONTROLLING A STEPPING MOTOR

[75] Inventors: Jean-Charles Sarbach; Daniel Virey, both of Les-Essarts-Le-Roi, France

[73] Assignee: Valeo, Paris, France

[21] Appl. No.: 533,274

[22] Filed: Jun. 4, 1990

[30] Foreign Application Priority Data

Jun. 7, 1989 [FR] France .................. 89 07553

[51] Int. Cl.⁵ .................................................. G05B 19/40
[52] U.S. Cl. ...................................................... 318/685
[58] Field of Search ................ 318/696, 685; 123/352

[56] References Cited

U.S. PATENT DOCUMENTS

| 4,224,907 | 9/1980 | Lefeuvre et al. ............ 123/352 |
| 4,455,520 | 6/1984 | Ward et al. ................... 318/696 |
| 4,540,928 | 9/1985 | Marhoefer ................... 318/696 |
| 4,683,409 | 7/1987 | Boillat ......................... 318/685 |
| 4,684,866 | 8/1987 | Nehmer et al. ............. 318/696 |

FOREIGN PATENT DOCUMENTS 0182774 5/1986 European Pat. Off. .
0305876 3/1989 European Pat. Off. .
3444220 5/1986 Fed. Rep. of Germany .

Primary Examiner—William M. Shoop, Jr.
Attorney, Agent, or Firm—Dennison, Meserole, Pollack & Scheiner

[57] ABSTRACT

A control system for a stepping motor includes at least one terminal which is adapted to be connected to at least one of the outputs of the power circuit supplying the stepping motor from a direct current voltage which is chopped by a clock signal, together with a filtering means for the potential of this output.

8 Claims, 5 Drawing Sheets

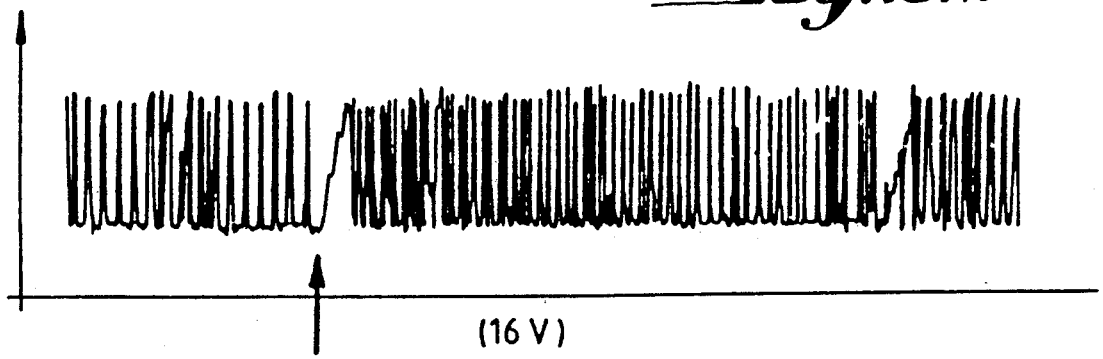
Fig. 2A.
(16 V)
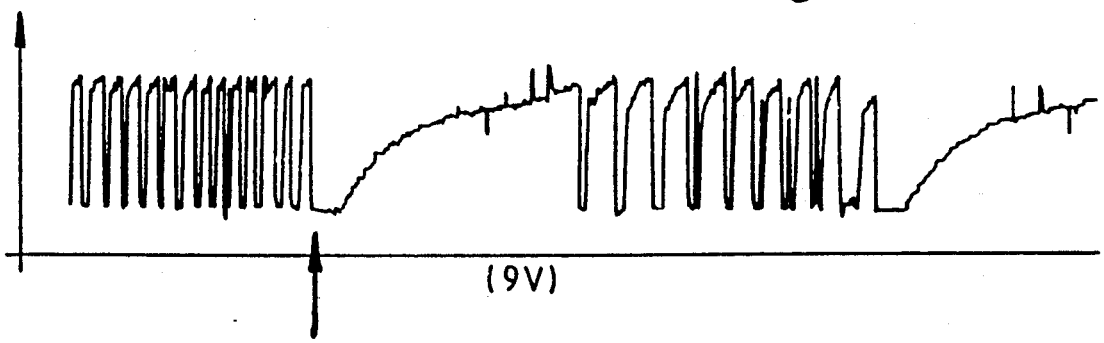
Fig. 2B.
(9V)
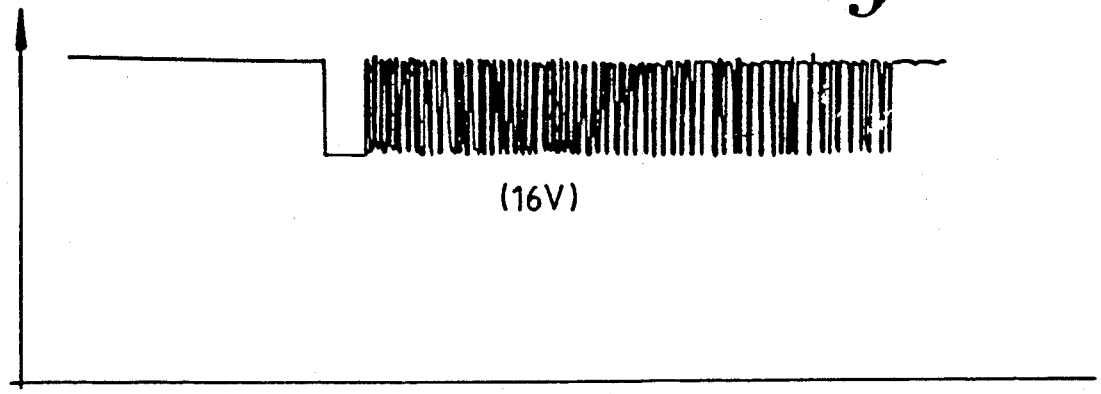
Fig. 3A.
(16V)
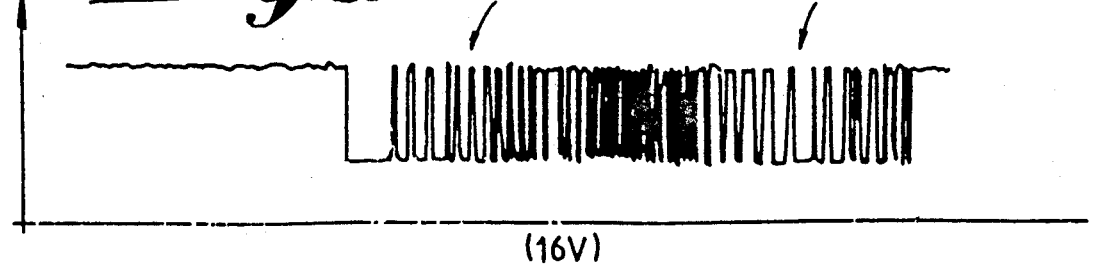
Fig. 3B.    P3B    P3B
(16V)

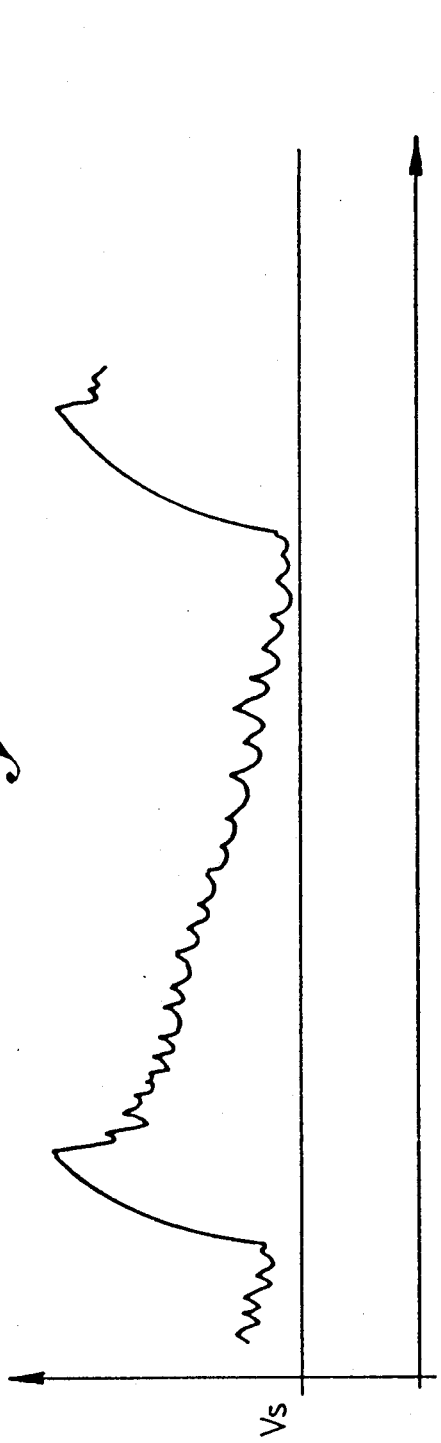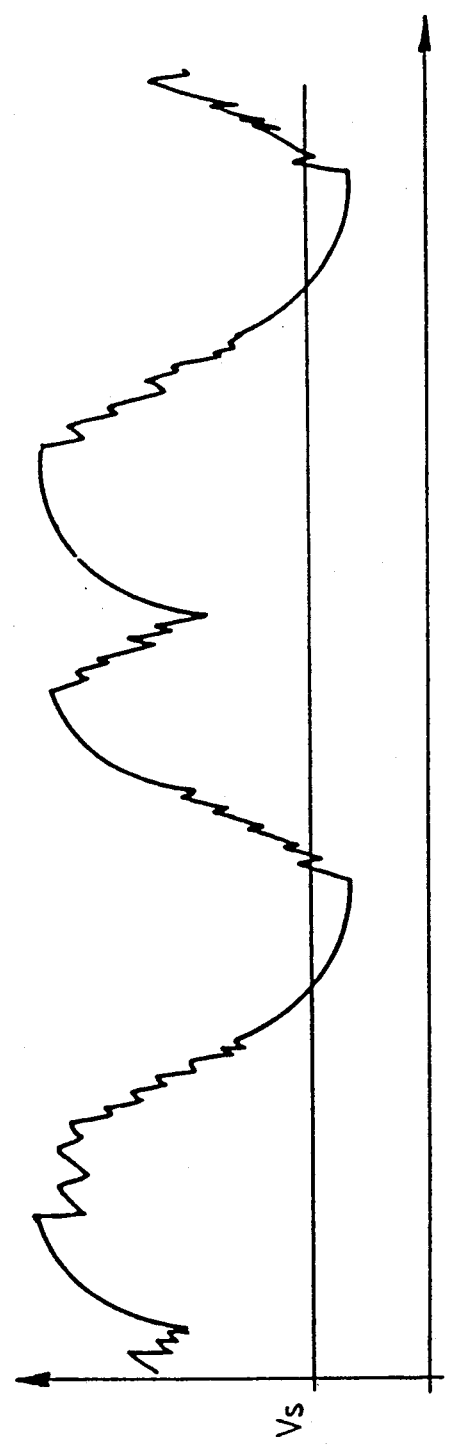

METHOD AND APPARATUS FOR CONTROLLING A STEPPING MOTOR

FIELD OF THE INVENTION

This invention relates to a method and apparatus for controlling a stepping motor. In particular, though not exclusively, it concerns those motors of the kind which are adapted to be associated with a reducer, in such a way as to form a motor reducer.

BACKGROUND OF THE INVENTION

It is known to chop a supply voltage in a direction current supply using a clock signal before applying it to the different windings or phases of the stepping motor. In carrying out regulation by pulse width, a constant current control of the windings is achieved.

When used in their proper context, stepping motors can advantageously replace the combination of a direct current motor and a position detector, since the position of the rotor is known at any instant in a stepping motor. However, having regard to the difficult conditions met in the operation of automotive equipment, such as variable direct current voltages, variable temperature, vibrations and so on, the use of stepping motors in such a context remains uncommon.

SUMMARY OF THE INVENTION

An object of the present invention is to provide a solution to this problem. The invention is applicable to the situation in which a stepping motor has phase windings which are supplied from a direct current voltage which is chopped by means of a clock signal, through a control circuit and a power circuit, with a feedback loop which feeds back towards the control circuit the effective value of the current applied to the windings by the power circuit. The concept of effective value is applied here so as to define a mean value from which the effects of chopping by the clock signal have been removed.

In accordance with an essential feature of the invention, variations in voltage, are monitored on at least one of the connections between the control circuit and the windings.

It has been observed that the waveforms of these variations in voltage, which appear in a shape which is hard to use in practice, may nevertheless be used for the purpose of obtaining information as to instabilities of the stepping motor.

The invention is also susceptible to a number of variations in this control procedure for a stepping motor, which can be applied in particular in the difficult environment of automotive equipment.

Other features and advantages of the invention will appear from the description which follows, and which is given by way of example only, with reference to the accompanying drawings.

BRIEF DESCRIPTION OF THE DRAWINGS

FIGS. 2A and 2B are two diagrams showing the variation of current with time in one of the windings for two very different supply voltages.

FIGS. 3A and 3B are two diagrams showing the variation with time of he voltage at one point in the system according to the present invention, respectively in a normal synchronous operating situation and in faulty operation of the stepping motor.

FIGS. 4A and 4B are two diagrams representing the variation of voltage with time at another point in the system of the invention, respectively for a normal synchronous operating situation and in faulty operation of the stepping motor reducer.

DESCRIPTION OF PREFERRED EMBODIMENTS OF THE INVENTION

The accompanying drawings include essentially elements of known types. In consequence, these are to be considered as being incorporated in the description, and will be able to serve not only to help in a better understanding of the description, but also to contribute to the definition of the invention if need be.

Figure 1:
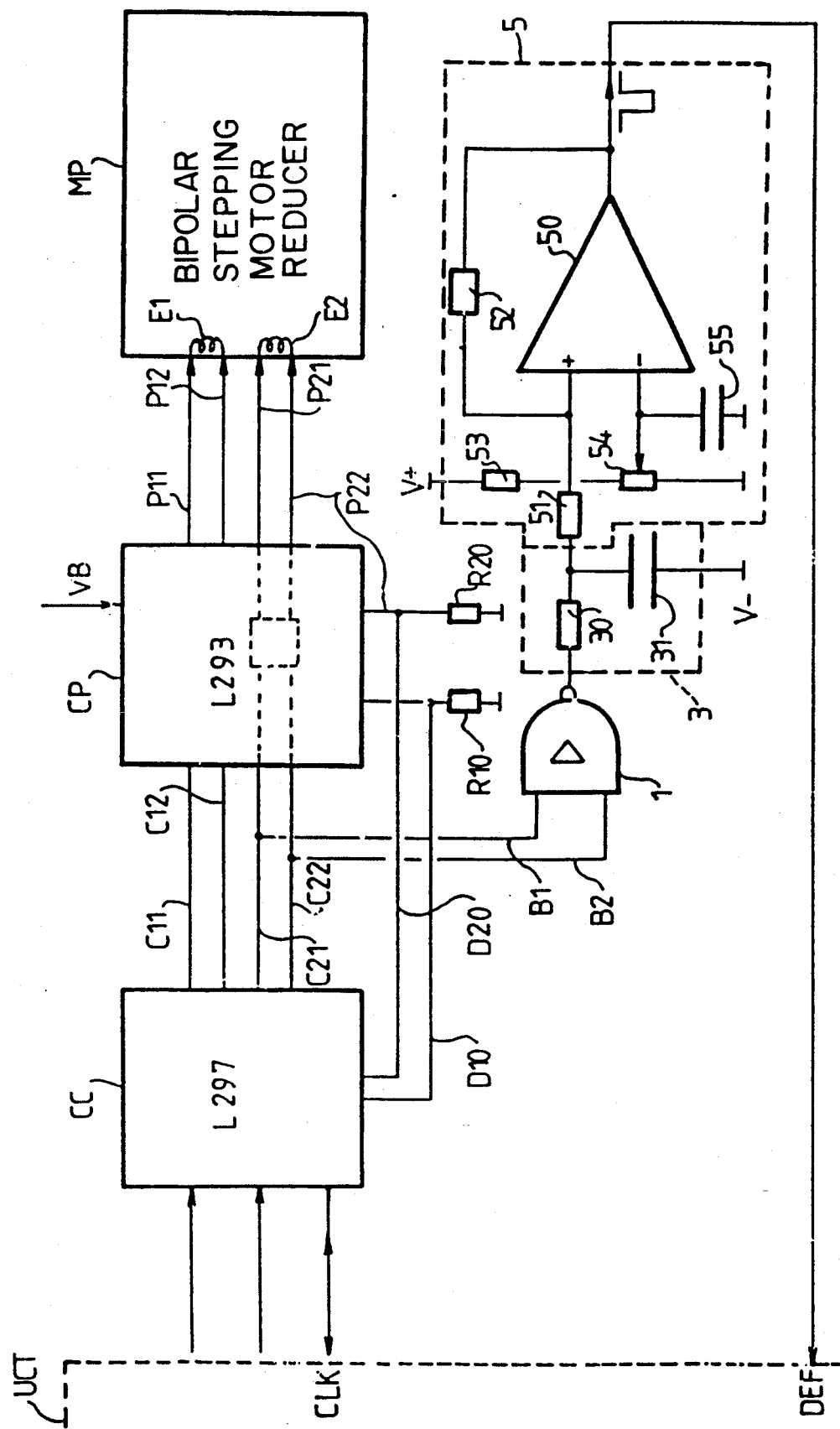
FIG. 1 is a schematic block diagram of a control system for a bipolar stepping motor reducer incorporating the present invention.

In FIG. 1, a bipolar stepping motor reducer MP, which has two windings or phases E1, E2, is controlled by a power circuit CP, which receives a continuous supply voltage such as the voltage VB from a battery. The power circuit is governed by a control circuit CC, which receives two logic input signals, namely a signal EN which enable the operation of the motor reducer, and a signal DRI which defines its direction of rotation.

A signal CLK, (which is a logic type signal), that represents the number of command steps for the motor-reducer MP, is furnished to circuit CC and makes use of any return information.

The circuits CP and CC may repectively consist of those sole by the company S.G.S. under the Model Nos. L293 and L297. It is known to associate with the control circuit CP at least one resistance, which in this example comprises a pair of resistors R10 and R20, to ensure that the currents in the windings E1 and E2 are earthed. The voltages at the terminals of the resistors R10 and R20 thus represent the winding currents. Two connections D10 and D20 retransmit this information to the control circuit CC, which then governs the power circuit CP through two pairs of connecting lines or wires C11, C12 and C21, C22 respectively. The power circuit CP then applies constant control currents respectively to the winding E1 through a pair of connecting lines P11 and P12, and to the winding E2 through a pair of connecting lines P21 and P22.

FIGS. 2A and 2B illustrate the waveforms of the winding currents for battery voltages of 16 volts and 9 volts respectively. In each of these two Figures, the vertical arrow indicates the commencement of excitation of a winding. At a voltage of 16 volts (FIG. 2A), a rapid rise in current may be observed, followed by chopping of the current until the next excitation of the same winding. Where the supply voltage is 9 volts (FIG. 2B), the control current takes considerably longer to become established, and this establishment is followed by a chopping phase in which the time interval before the new excitation of the same phase is a little longer.

FIGS. 2A and 2B are concerned with normal operation, that is to say the required synchronism is present in the stepping motor reducer. This is the case where the number of steps commanded is equal to the number of steps carried out.

The waveform of the control current is considerably more complex when the stepping motor reducer is in a fault situation, for example where there is a loss of synchronism or omission of a step for any reason at all. It has been noticed that, in those case in which instability of the motor reducer occurs, the qualitative and quantitative waveform of the phase current is modified.

The experiments carried out have led to the observation of difference in potential between the control lines, such as the lines C21 and C22, existing at the output of the control circuit CC and the power circuit CP. In a manner which is totally unexpected, it has proved possible, subject to suitable processing of this signal, to make use of it in order to identify the instabilities of the stepping motor, and even to go as far as delivering a signal in a logical form representing the point in time at which such instabilities occurred. The system shown in the lower part of FIG. 1 enables this function to be carried out.

The system includes two input terminals B1 and B2, respectively connected to the lines C21 and C22, and leading to the inputs of a NOT-AND gate 1. The latter carries out the logical summation of the signals present on the lines C21 and C22, which is equivalent to taking the difference in their potentials, with peak limiting and logical inversion since a NOT-AND gate is used.

FIG. 3A shows the waveform, for a battery voltage of 16 volts, of the output signal from the NOT-AND gate during excitation of one phase of the stepping motor, in normal synchronous operation of the latter. In the event of a malfunction or instability, the output of the NOT-AND gate is modified as shown in FIG. 3B, in which there appears, in particular, a period P3B during which the output from the NOT-AND gate is chopped at longer intervals.

The output signal of the NOT-AND gate is applied to a low pass filter 3, which can simply consist of a resistor 30 and a capacitor 31 leading to the negative supply voltage V- for the logic circuits.

FIG. 4A illustrates the output signal of this filter in normal operation as in FIG. 3A. At the start of excitation of the winding E2 of the motor, the voltage at the terminals of the capacitor 31 increases rapidly. It then decreases progressively in a manner modulated by residues of the clock signal, to decay down to a relatively small value at the instant when the winding concerned is once again excited.

By contrast—and this is an observation which is fundamental to the basis of the invention—in the presence of a malfunction of the stepping motor, although the voltage from the filter 3 (FIG. 4B) rises in much the same manner, it then decreases much more rapidly, to rise once again in the phase P3B shown in FIG. 3B. Relatively erratic variations then follow, corresponding to chopping of the supply current which is equally erratic because of the malfunction.

It is thus possible to define a threshold value VS, below the levels which are normally attained by the output signal from the filter 3 in normal synchronous operation but which, in the presence of a malfunction of the stepping motor, will be contrast be depressed. It has proved possible to define this lower limit VS as a function of the specification for the particular application required for the stepping motor, under the normal operating conditions for the motor reducer.

Figure 5:
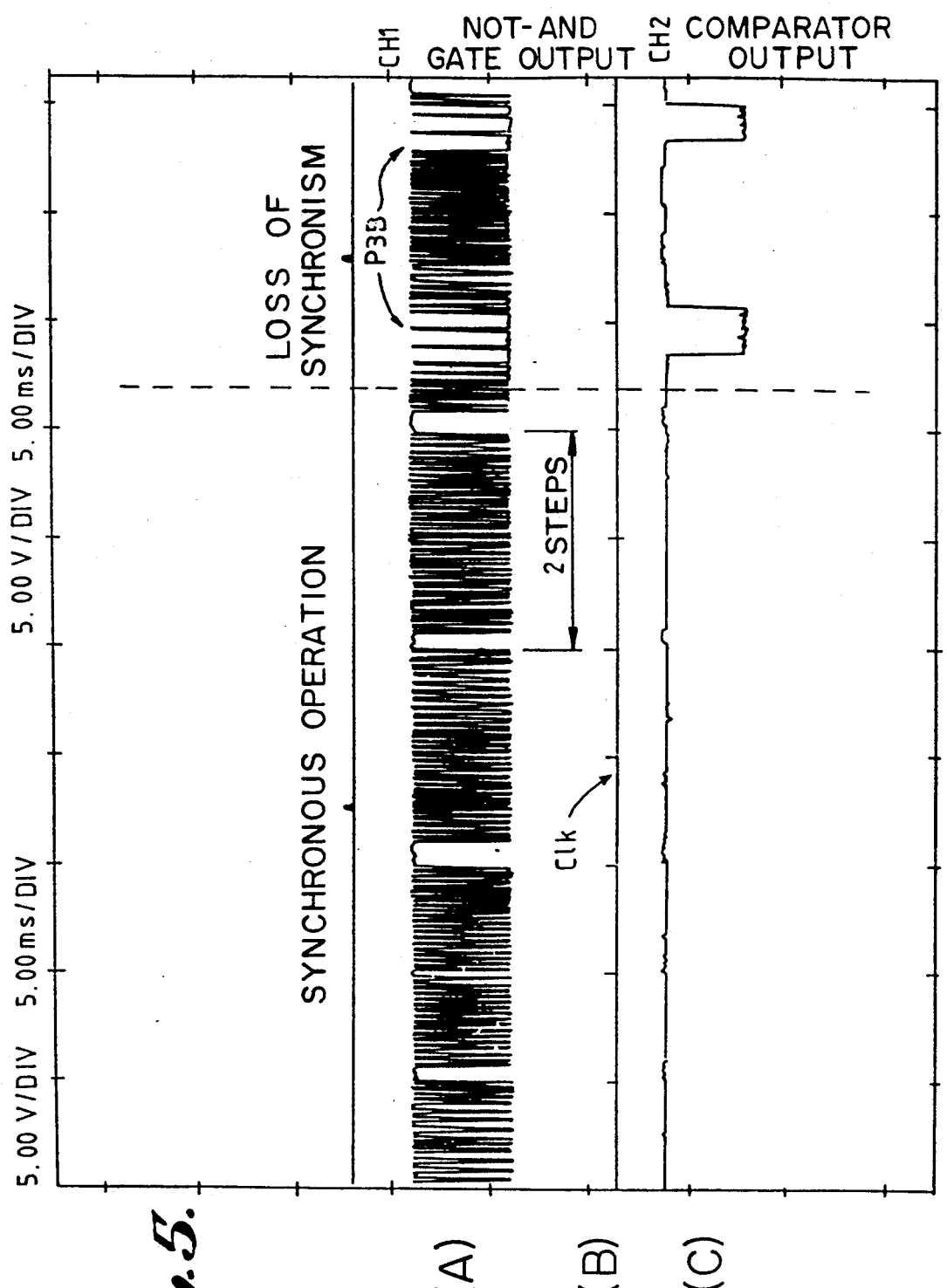
FIGS. 5A to 5C are illustrations of the general mode of operation of the arrangement in accordance with the invention.

Reference is now made to FIG. 5, which shows consecutively a synchronous function and a loss of synchronism on one of the phases of the motor. The line A in FIG. 5 shows the output from the NOT-AND gate 1. The line B shows the clock signal (not for the chopping but for the control of the stepping motor), and this Figure shows that each winding is excited only on every other step.

The line C in FIG. 5 shows that the output from a comparator which is set at the threshold voltage VS will change to a low level at the instant of loss of synchronism of the stepping motor.

If reference is now made once again in FIG. 1, such a comparator 5 may comprise a resistor 51 leading to the non-inverting input of a differential amplifier 50 which is provided with a reaction resistor 52. The inverting input of the amplifier 50 is connected to a voltage dividing bridge comprising a fixed resistor 53 and an adjustable resistor 54, with decoupling through a capacitor 55. The resistor 54 is adjusted so as to apply the threshold voltage VS, defined above, to the inverting input of the comparator 50.

Figure 6:
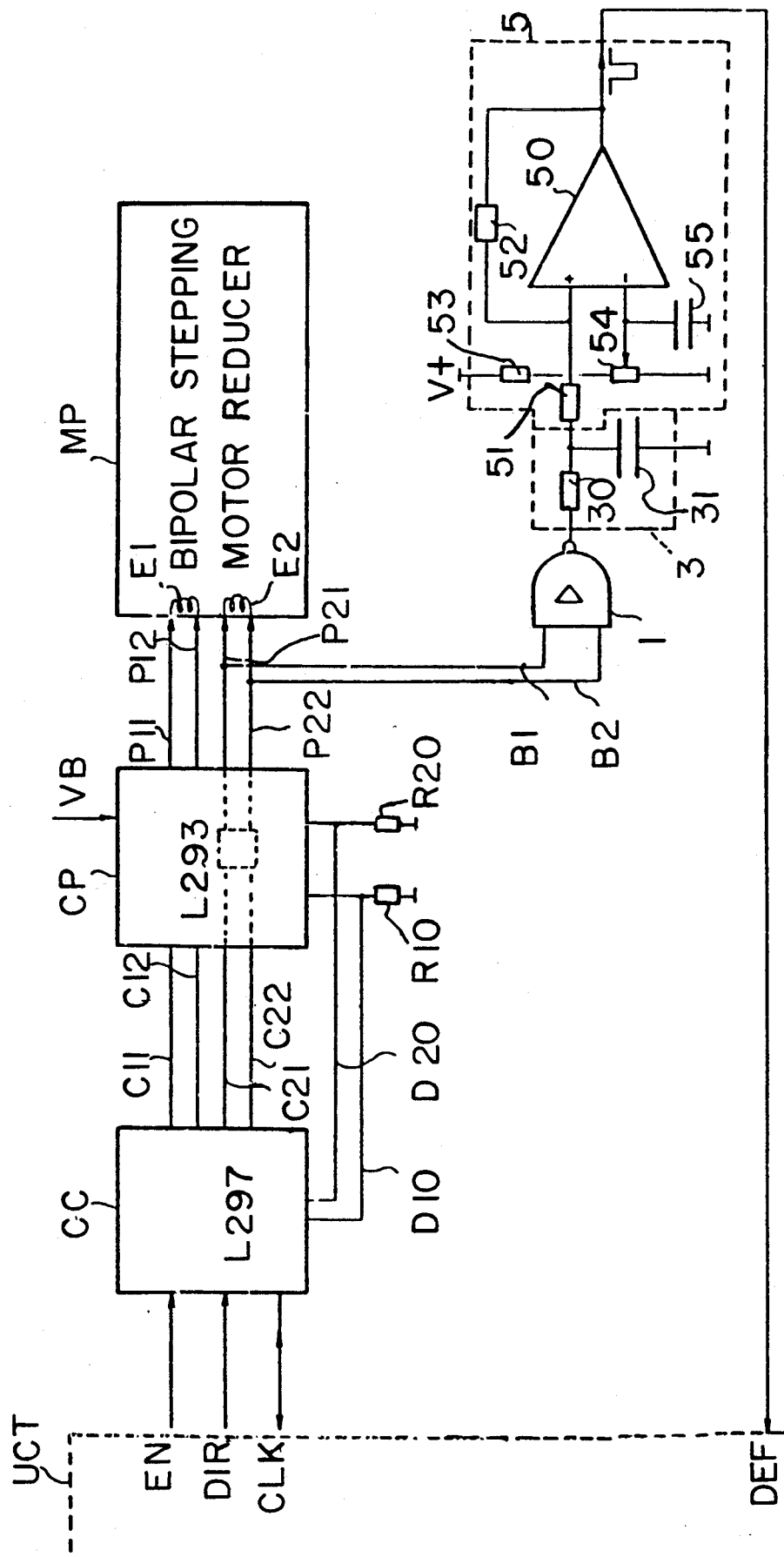
FIG. 6 shows a modification of the arrangement shown in FIG. 1.

In the variant shown in FIG. 6, the two input terminals B1 and B2 are respectively connected to the connecting lines P21 and P22 which connect the power circuit CP to the windings E2 and which also, in this embodiment, lead to the inputs of the NOT-AND gate 1. As described above, the latter performs a logical summation on the signals present on the lines P21 and P22, which is again equivalent to taking the difference in their potential, with phase limiting and logical inversion since a NOT-AND gate is being used. The processing of the output signal from this gate is carried out in the same way as that described above.

In the prior art, the control of the circuit CC is effected for example by means of a microprocessor UCT, which supplies the signals EN and DIR and which supplies or the signal CLK which represents the steps commanded by the circuit CC. It is also possible for microprocessor UCT to receive signal CLK from CC. Using the system according to the invention, it will receive in addition, on its input DEF, an output signal from the comparator 5, which will allow it to know which steps are those not carried out by the stepping motor MP.

This arrangement is highly relevant in that it permits the use of stepping motors, and in particular of stepping motor reducers, in such applications as those of automotive equipment, where their operation has hitherto been very problematic having regard to the difficult environment: for example, in particular, due to vibrations and the high variability of factors such as battery voltage and temperature. With the arrangement in accordance with the invention, it becomes possible to use a stepping motor or a stepping motor reducer or both in such a context.

In addition, the arrangement according to the invention allows the movement of a member controlled by the motor reducer to be fully quantified, by means of a preliminary run between end stops of this movement and counting of the number of real steps involved; and this can be done at any time. Beyond that it becomes possible to control with precision the position of any member, or to detect an overtorque encountered in the control of such a member, which may be linked for example with the presence of some obstacle in the path of the member being controlled.

Better still, the stepping motor reducer thus becomes an actuator which is able to communicate its position remotely, or to indicate one or several irregularities in operation, to a control system or a command system which is physically separated from the stepping motor reducer and which is preferably linked with a microprocessor.

Although the effects involved are not yet fully understood, it appears that the existence of a feedback loop between the power circuit and the control circuit are necessary in order to put the invention into practice. The arrangement of the invention operates well when this loop is used so as to produce constant current control of the windings of the stepping motor. It does however seem that it is also able to operate under conditions other than that of a constant current control.

Although the invention has been described up to this point in terms of an analogue method, it can be envisaged without departing from the scope of the invention that the comparison between variations in filtered voltage and the threshold value VS may be carried out in a digital manner.

In addition, trials carried out up to the present time have mainly been performed on motor reducers which have the feature that the shaft of the stepping motor exhibits some backlash due to the presence of the reducer when the lead is blocked. Although it is not at present possible to be quite certain, it does seem that the existence of such backlash, due to the motor reducer or to some other cause, plays a part in the operation of the device according to the invention.

Furthermore, in certain applications only two of the control lines of a bipolar stepping motor reducer need to be monitored. It is of course possible to monitor all four control lines of such a stepping motor reducer. The invention can also be applied to stepping motor reducers having more than two windings, for example by multiplying the number of control lines monitored.

What is claimed is:

1. A method for controlling a stepping motor having a plurality of phase windings, said method comprising the steps of:
   synchronizing said stepping motor by supplying a chopped voltage;
   monitoring said chopped voltages on at least two control line connecting said plurality of phase windings of said stepping motor to a control circuit;
   summing said chopped voltages to provide a variation voltage;
   filtering said variation voltage to eliminate erratic effects caused by instabilities of said stepping motor wherein said erratic effects include loss of synchronism between the stepping motor and said chopped voltages;
   comparing said filtered variation voltage with a predetermined threshold voltage;
   obtaining an effective value voltage based on said step of comparing;
   returning said effective value voltage to said control circuit by way of a feedback loop; and
   resynchronizing said chopped voltages on said at least two control lines connected to said plurality of phase windings to control said stepping motor.

2. A method according to claim 1, comprising the step of:
   monitoring a first connection between said control circuit and a power circuit wherein said power circuit is connected to said plurality of phase windings.

3. A method according to claim 1, comprising the step of:
   monitoring a second connection between a power circuit and said plurality of phase windings wherein said power circuit is connected to said control circuit.

4. A method according to claim 1, comprising the step of:
   connecting a reducer to said stepping motor to form a stepping motor reducer.

5. An apparatus for controlling a stepping motor having a plurality of phase windings, said apparatus comprising:
   a control circuit for synchronizing said stepping motor, said control circuit including a chopping circuit for providing chopped voltages;
   a feedback loop circuit having a feedback loop, said feedback loop circuit including
   means for monitoring said chopped voltages on at least two control lines connecting said plurality of phase windings of said stepping motor to said control circuit;
   means for summing said chopped voltages to provide a variation voltage;
   means for filtering said variation voltage to eliminate erratic effects caused by instabilities of said stepping motor wherein said erratic effects include loss of synchronism between the stepping motor and said chopped voltages;
   means for comparing said filtered variation voltage with a predetermined threshold voltage;
   means for obtaining an effective value voltage based on said comparing means;
   means for returning said effective value voltage to said control circuit by way of said feedback loop of said feedback loop circuit; and
   said control circuit resynchronizing said chopped voltages on said at least two control lines connected to said plurality of phase windings of said stepping motor based on said received effective value voltage.

6. The apparatus according to claim 5, comprising:
   means for monitoring a first connection between said control circuit and a power circuit wherein said power circuit is connected to said plurality of phase windings.

7. The apparatus according to claim 5, comprising:
   means for monitoring a second connection between a power circuit and said plurality of phase windings wherein said power circuit is connected to said control circuit.

8. The apparatus according to claim 5, comprising:
   means for connecting a reducer to said stepping motor to form a stepping motor reducer.

* * * * *